United States Patent
Calandra

(10) Patent No.: US 8,444,809 B2
(45) Date of Patent: May 21, 2013

(54) METHOD AND SYSTEM FOR DIRECT CONTACT OF HOT LIQUOR WITH WOOD CHIPS IN TRANSFER CIRCULATION

(75) Inventor: Anthony Calandra, Cumming, GA (US)

(73) Assignee: Andritz Inc., Glens Falls, NY (US)

( * ) Notice: Subject to any disclaimer, the term of this patent is extended or adjusted under 35 U.S.C. 154(b) by 1415 days.

(21) Appl. No.: 11/767,761

(22) Filed: Jun. 25, 2007

(65) Prior Publication Data

US 2008/0314534 A1 Dec. 25, 2008

(51) Int. Cl.
*D21C 3/22* (2006.01)
(52) U.S. Cl.
USPC .......................................... 162/42; 162/239
(58) Field of Classification Search
USPC ................................... 162/42, 239
See application file for complete search history.

(56) References Cited

U.S. PATENT DOCUMENTS

| | | | | |
|---|---|---|---|---|
| 5,885,414 | A * | 3/1999 | Lindstrom et al. | 162/19 |
| 6,179,958 | B1 * | 1/2001 | Lysen et al. | 162/17 |
| 2004/0060672 | A1 * | 4/2004 | Snekkenes et al. | 162/19 |

* cited by examiner

*Primary Examiner* — Jacob Thomas Minskey
(74) *Attorney, Agent, or Firm* — Nixon & Vanderhye P.C.

(57) ABSTRACT

A method for heating a chip slurry in a pulping system including an impregnation vessel and a chemical digesting vessel, the method including: impregnating chips in the impregnation vessel with a liquor; transporting the chips from the impregnation vessel to an upper elevation of the digester vessel; extracting liquor from a lower elevation of the digester vessel, wherein the extracted liquor has a temperature substantially higher than a temperature of the chips being transported to the upper elevation of the digester vessel, and adding extracted liquor from the lower elevation of the digester vessel to the chips being transported from the impregnation vessel to the digester vessel.

20 Claims, 2 Drawing Sheets

METHOD AND SYSTEM FOR DIRECT CONTACT OF HOT LIQUOR WITH WOOD CHIPS IN TRANSFER CIRCULATION

BACKGROUND OF THE INVENTION

The present invention relates generally to the field of chemical treatment of comminuted cellulosic fibrous material (generally referred to herein as "chips"). In particular, the invention relates to heating chips in a pulping system and processing black liquor in the system, which includes an impregnation vessel and a chemical digesting vessel.

To produce pulp in a chemical pulping process, the lignin bonds between cellulose fibers are dissolved by "cooking" wood chips (or other cellulosic fibrous material) in a digester vessel containing chips and cooking liquor. White liquor is generally referred to as the virgin liquids and cooking chemicals before being introduced to the chip slurry. Black liquor, typically produced during the digesting process, is the combination of the lignin residue with water and the chemicals used for digesting the chips to form pulp. Black liquor is extracted from the pulping system, such as from the digester vessel. Black liquor can be introduced to the cooking process and removed during the cooking process.

FIG. 1 shows a conventional chemical digesting system 100, that processes wood chips. A continuous feed of wood chips is transported from a chip feed system (not shown) via line 101 to an impregnation vessel 102. Chips are pretreated with cooking liquor in the impregnation vessel 102. From the impregnation vessel 102, chips and liquor flow in a slurry through line 106 to the top inlet 103, e.g., top separator, of a chemical digester vessel 104. The top separator 103 in the upper internal region of digester vessel 104 feeds the chips to the inner chamber of the digester vessel.

As the chips and liquor flow through the top separator 103, a portion of the black liquor is extracted from the digester vessel via liquor circulation line 108. The liquor extracted from the top separator flows through an in-line drain 110, which directs the extracted liquor to a heat recovery unit 114 via line 112 or to a liquor circulation line 116.

A conventional liquor circulation line 116 transports a portion, e.g. 90%, of the liquor passing through the in-line drain 110 to the chip discharge at the bottom of the chip impregnation vessel 102 or to the chip slurry line 106. A liquor pump 118 may be used to move the liquor through the line 116 and to the chip slurry flowing from the impregnation vessel and to the digester vessel. The extracted liquor in line 116 is added to the pretreated chips discharged from the impregnation vessel and being transported via line 106 to the digester vessel.

The extracted liquor is introduced to the chip slurry in line 106 at or near the bottom of the impregnation vessel to increase the liquor content of the slurry for transport through the line. The liquor from line 116 is introduced to the chip slurry to reduce the concentration of chips in the slurry and facilitate chip transport through the chip slurry line 106. The slurry flows from the impregnation vessel through line 106 to the top of the digester vessel 104.

Conventionally, a small portion, e.g., 10%, of the extracted liquor flows via line 112 to the heat recovery system 114, e.g., the heat exchanger. The temperature of the extracted liquor flowing through the in-line drainer 110 and heat exchanger is, for example, about 110° C. (Celsius). Heat energy from the extracted liquor may be used in a heat exchanger to generate, for example, low pressure steam, e.g., at 1 bar, for use in the puling mill.

The liquor concentration L/W (ratio of liquor to chips by weight) in the impregnation vessel may be 2.5. In the chip slurry line 106, the liquor concentration (L/W) is increased by the addition of liquor (line 116) to the chips in the bottom of the impregnation vessel or an initial region of the chip slurry line 106. The addition of liquor and aid increase I the L/W in transporting the chips through the chip slurry line 106. When the slurry enters the digester vessel 104, the ratio of liquor to chips (L/W) is reduced by, for example, extracting liquor at the top separator.

Heat is often added to the chips in the digester vessel. Generally, a digester vessel operates at a higher temperature than does an impregnation vessel. For example, an impregnation vessel may operate at a temperature of 110° C. and the digester vessel may operate at temperature of 140° C. The chip slurry enters the top separator at a lower temperature then the temperature in the digester vessel. Heat, such as medium pressure steam via line 134, is added to the vessel to increase the temperature of the chips in the digester vessel. Medium pressure steam 146 is typically at a pressure of 10 to 12 bar and a temperature of 180° C. to 190° C. The temperature of the digester vessel tends to be lowest at the top inlet of the vessel and progressively increases in a downward direction through the vessel.

The digester vessel 104 generally includes multiple elevations of screens, including screens at upper elevations of the digester vessel (where upper refers to screens 120, 121 that are above the lower elevations of screens 122). Screen(s) 122 (generally referred to as wash screens) at lower elevations of the digester vessel may be near the bottom of the digester vessel, such as in the lower third (⅓) to one quarter (¼) of the digester vessel. Liquor is extracted through the upper elevation screen 120 and fed via liquor line 124 to the heat recovery system 114. Liquor to be recirculated through the digester is removed by upper elevation screen 121 and fed to a liquor recirculation line 126.

Other sources of liquor for circulation in the digester may include wash liquor (W.L.) 140 and a cold blow liquor system 142. The was liquor 140, cold blow liquor 142 and liquor extracted from screen 121 are combined in line 126 and pumped 127 to a heater 44. The liquor for recirculation is heated in the heater 144 that uses a steam source 146 for heat energy. Typically, the circulation liquor is reintroduced via line 126 to the vessel at a different, e.g. higher, elevation from which the liquor was extracted.

The liquor extracted from lower elevation(s) of screens 122 may be, via line 128, circulated to the digester at a higher elevation or discharged to the heat recovery system. The liquor from the lower elevation(s) of screens 122 tends to be hotter, e.g., 140° C., than liquor extracted from the top separator 103 (via line 108) and liquor extracted from screens 120 at upper elevations (via lines 124, 126). The hot liquor (line 128) from the lower region of the digester is recirculated to the top of the digester, via line 132 and pump 130, without adding heat to the liquor. Below the lower elevation screens and near the pulp discharge, cold blow, e.g., cooled wash liquor, is added to reduce the temperature of the pulp being discharged from the digester through line 145. The cold blow is provided from a source 142 of cooling liquor and passes through a cold blow cooler 143 and lines to direct the cold blow to the bottom of the digester.

Generally a large portion, e.g., 70%, of the liquor extracted via line 128 from the lower elevation screens 122 flows to the heat recovery system 114. For example, liquor extracted to line 128 from the lower elevation of screens 122 may be divided such that a first portion, e.g., 70% to 80%, of liquor flows via line 128 to the heat recovery system 114; a second portion, e.g., 10% to 18%, of the liquor is pumped 130 to line 126 for recirculation to the top of the digester vessel, and a third portion, e.g., 8% to 12%, of the liquor is pumped 130 via line 132 to recirculation line 126.

The excess black liquor, e.g. waste liquor, extracted from screens in the digester vessel and not reintroduced to the vessel or to the chip slurry line 106, flows through the heat recovery system 114. A portion of all streams of excess liquor, e.g., from in-line drainer and upper and lower extraction screens, tend to flow through the heat recovery system where heat energy from the excess liquor is converted to steam, typically low pressure steam, for other uses in the mill. Low pressure steam is typically at 1 bar or less at a temperature of about 100° C., such as in a range of 90° C. to 110° C.

To increase the temperature of the chips in the digester vessel, medium pressure steam 146 is often added to the digester vessel via steam line 136 and heater 144. The medium pressure steam comes in at a temperature of 180° C. to 190° C. and increases the temperature of the chips in the digester vessel to promote the chemical reactions for digestion, e.g., breaking the lignin that bonds together the cellulosic fibers in the chip. Medium pressure steam requires energy to generate. Further, evaporators are generally needed to remove condensate resulting from the steam injected into the digester vessel.

There is a long felt need to reduce the energy requirements for a pulping system, including systems having an impregnation vessel and digester vessel. In particular, there is a long felt need for techniques to add heat to the chips in the digester vessel, which improve the energy efficiency of the pulping system and reduce the need for steam from external sources such as steam source 146.

BRIEF DESCRIPTION OF THE INVENTION

Hot black liquor extracted at the lowest or lower screens in a digester is added to the chip slurry being transported from an impregnation vessel to a digester vessel. The hot liquor adds heat to the chip slurry before the slurry enters the top separator. The chips enter the digester vessel at a higher temperature that would occur if hot black liquor were not added. The heated chip slurry in the top separator reduces heat energy to be added to the digester vessel. The energy requirement of the digester vessel is reduced because hot black liquor is added to the chip slurry before the chips enter the digester.

A method has been developed for heating a chip slurry in a pulping system including an impregnation vessel and a chemical digesting vessel, the method comprising: impregnating chips in the impregnation vessel with a liquor; transporting the chips from the impregnation vessel to an upper elevation of the digester vessel; extracting liquor from a lower elevation of the digester vessel, wherein the extracted liquor has a temperature substantially higher than a temperature of the chips in the impregnation vessel, and adding extracted liquor from the lower elevation of the digester vessel to the chips to be or being transported from the impregnation vessel to the digester vessel.

A method has been developed for heating a chip slurry in a pulping system including an impregnation vessel and a chemical digesting vessel, the method comprising: impregnating chips in the impregnation vessel with a liquor; transporting the chips from the impregnation vessel to a top separator of the digester vessel; extracting liquor from a lower elevation screen of the digester vessel, wherein the extracted liquor has a temperature at least 20 degrees Celsius higher than a temperature of the chips in the impregnation vessel, and adding the extracted liquor from the lower elevation screen of the digester vessel to the chips to be or being transported from the impregnation vessel to the digester vessel.

An apparatus has been developed for heating a chip slurry in a pulping system including an impregnation vessel and a chemical digesting vessel, the apparatus comprising: a chip transport conduit extending from the impregnation vessel to the digesting vessel, wherein chips in the chip transport conduit flow from the impregnation vessel to the digesting vessel; a lower elevation screen on the digesting vessel, wherein hot liquor is extracted from the lower elevation screen; and a first liquor conduit extending from the lower elevation screen to the chip transport conduit, wherein liquor extracted from the lower elevation screen is added to the chip transport conduit.

DETAILED DESCRIPTION OF THE INVENTION

A system and method has been developed to recover heat from the excess black liquor extracted from the lower sets of screens or lowest set of digester screens (generally referred to as the wash screens) to heat the black liquor in the chip slurry circulation line between the top of the digester and the bottom of the impregnation vessel.

Figure 2:
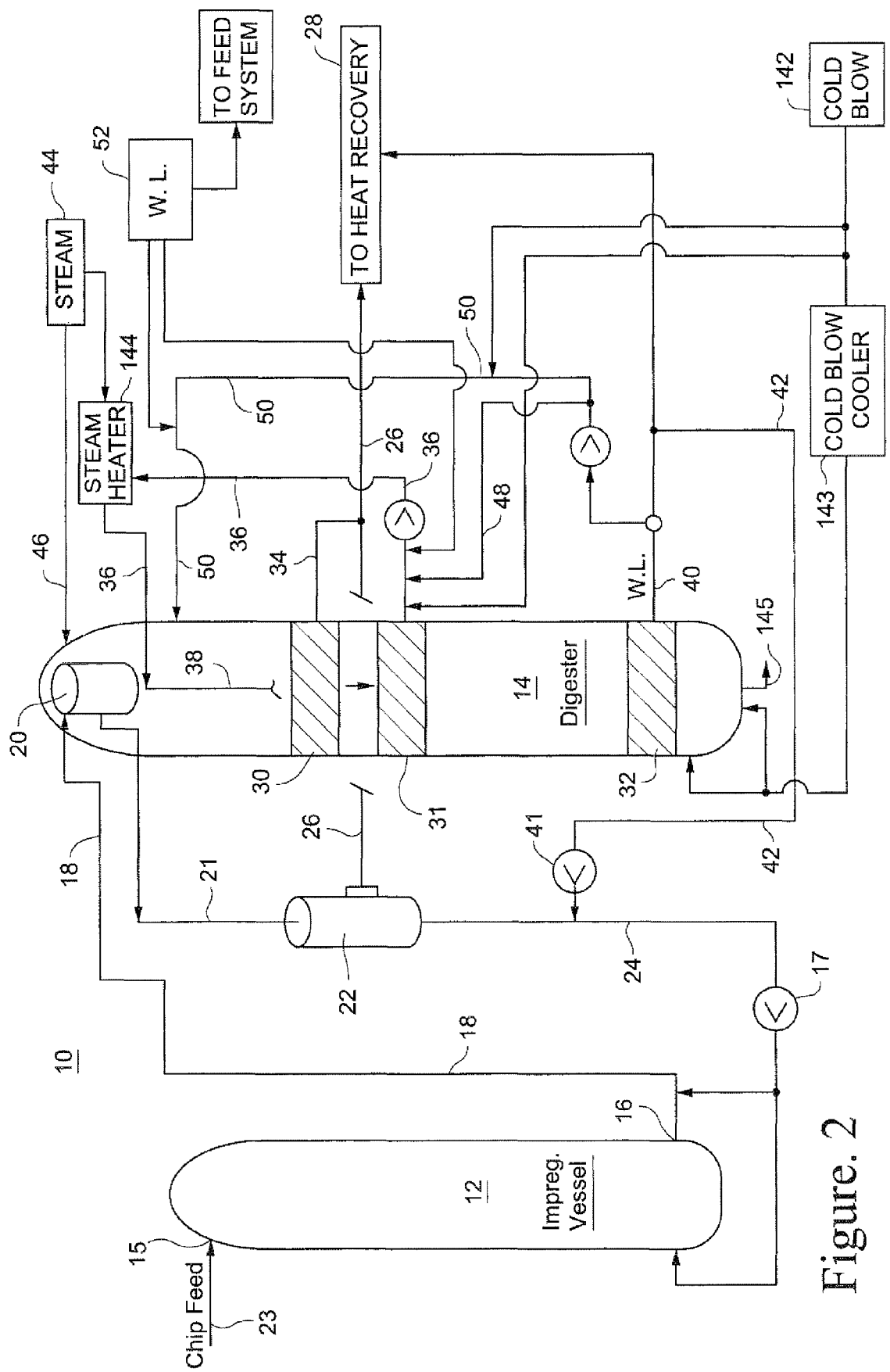
FIG. 2 is a schematic diagram of a chemical chip digesting system including an impregnation vessel and a chemical digesting vessel, wherein hot black liquor extracted from a lower region of the digester vessel is added to the chip slurry flowing from the impregnation vessel to the digester vessel.

FIG. 2 is a schematic diagram of a chemical chip digesting pulping system 10 including an impregnation vessel 12 and a chemical digesting vessel 14. The impregnation vessel receives a supply feed 23 of chips at an upper inlet 15. The impregnation vessel 12 is upstream of the digester vessel 14, in the direction of chip flow through the pulping system. The impregnation vessel pre-treats a chip with cooking liquor in the vessel. The impregnation vessel is a pretreatment vessel for the chemical digester vessel.

Chips and liquor (the chip slurry) discharged from a bottom outlet 16 of the impregnation vessel flow through a chip circulation line 18 to a top separator 20 in the upper region of the digester vessel. As the chip slurry flows through the top separator, a portion of the liquor is extracted through screens in the top separator and flows out the digester through a liquor circulation line 21.

The liquor concentration (L/W) in the impregnation vessel 12 may be lower than the liquor concentration in the digester vessel. The liquor concentration in the transport stream (line 18) increases the L/W concentration levels in the impregnation vessel and digester vessel to transport the chips from the impregnation vessel through line 18 to the digester vessel 14. In the digester, liquor from the incoming chip feed stream (line 18) is extracted from the top separator 20 to a liquor circulation line 21 and flows to an in-line drain 22. The extraction of liquor from the top separator reduces the L/W ratio for the chips in the digester to a L/W level below that in line 18. A portion, e.g., about half of the flow, of the liquor passing from line 21 through the in-line drain 21 flows through a liquor circulation line 24 and is returned to the chip stream flowing from the impregnation vessel to the digester. The returned liquor in liquor circulation line 24 is added to the bottom 16 of the impregnation vessel or to an initial portion of the chip circulation line 18. A pump 17 may force the liquor through line 24 and into the chip slurry in line 18. The returned liquor is added to increase the portion of liquor, e.g., increase the L/W ratio, in the chip slurry flowing through line 18 between the impregnation vessel and digester vessel.

A second portion of the liquor flow through the in-line drain 22 flows through liquor line 26 to a heat recovery system 28, e.g., heat exchanger. The volume of the second portion of the excess liquor extracted from the top separator may be about one-half (½) of the volume of excess liquor flowing through the in-line drain 22.

Figure 1:
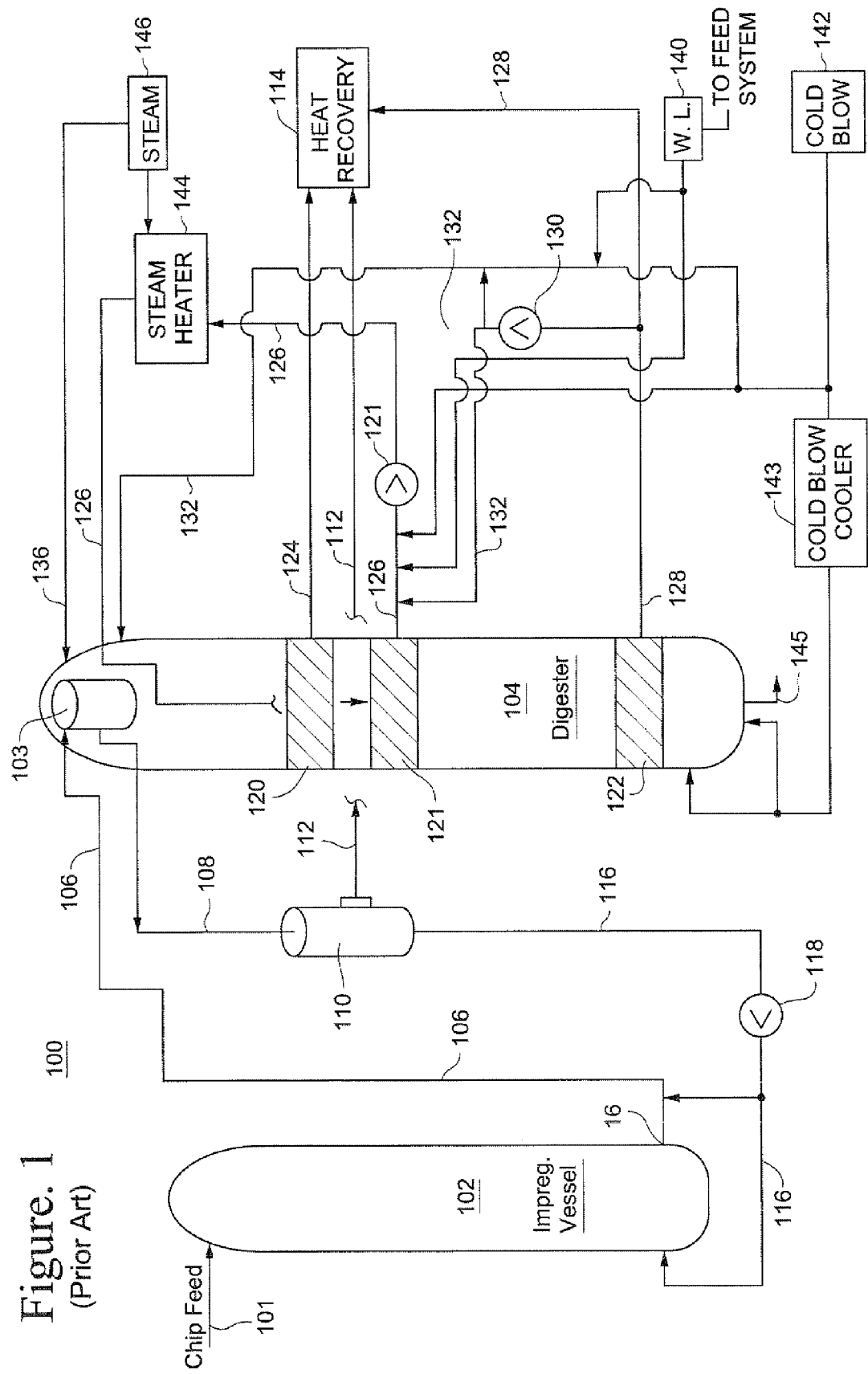
FIG. 1 is a schematic diagram of a conventional chemical chip digesting system including an impregnation vessel and a chemical digesting vessel.

A relatively large portion of black liquor passing through the in-line drain 22 (such as one-half of the liquor passing through the drain) is directed to the heat exchanger 28, as compared to portion of liquor from the in-line drain that flows to the heat exchanger of the conventional system shown in FIG. 1. A relatively small portion of the black liquor flowing through the in-line drain (such as one-half of the liquor passing through the drain) flows through line 24, where it mixes with hot black liquor (from line 42) and is added to the chip slurry line 18. The portion passing through the in-line drain that is directed to chip transport line 18 may vary depending on the amount of liquor needed in the chip transport line 18, and sent to heat recovery.

The chips and cooking liquor discharged to the digester vessel from the top separator 20 flow down through the digester vessel 14. Screens 30, 31, 32 at various elevations of the digester vessel extract black liquor from the chip slurry in the vessel. The screens are conventional and well-known in the art of chemical pulp digesting. The extraction and circulation of liquor from the upper screens 30 and 31 is conventional and, as an example, is similar to the extraction and circulation shown in FIG. 1 of the screens 120, 121. The black liquor extracted from extraction screens 30 at upper elevations of the digester vessel extract black cooking liquor that may flow to the heat recovery system 28 via liquor line 34. Liquor from the recirculation screens 31 at upper elevations may also be circulated to an upper region 38 of the vessel, e.g., the top separator via liquor circulation line 36. In addition, white liquor (W.L.) 52 may be added to the liquor circulation line(s) 50 to ensure sufficient liquor in the top of the digester vessel.

The lower screen(s) 32, e.g., wash screens, in the digester vessel 14 provide a substantial flow of extracted hot black liquor. The lower screens may be in the lower third (⅓) or quarter (¼) of the height of the digester vessel. For example, the rate of black liquor extracted from the lower screen(s) for the chip slurry line 21 may be three (3) to four (4) times the rate of the black liquor flowing from the lower screen to the top separator to liquor line 21. A portion of the black liquor from the lower screen, e.g., 25%, may flow to upper regions of the digester vessel through lines 48 and 50.

The hot black liquor extracted from the lower screen(s) 32 is extracted via liquor wash line 40. A portion, e.g., 70% to 80%, of the extracted hot liquor flows from line 40 to line 42 that conveys the hot liquor to the chip slurry flowing from the impregnation vessel 12 to the digester vessel 14 via chip circulation line 18. A pump 41 may boost the pressure of the hot black liquor to the pressure of lines 24 or line 18. The hot black liquor from the lower screens 32 may be mixed with the cooler liquor from top separator in line 24. The mixed streams of black liquor are added to the chip transport line (conduit) 24 near the impregnation vessel and/or start of the chip transport.

Of the extracted black liquor from the wash screens 32 (line 40), about 30% to 80%, more preferably 50% to 70%, and most preferably 70% to 75%, of the black liquor is circulated to the circulation line between the top of the digester and the bottom of the impregnation vessel downstream of the in-line drainer.

The temperature of the black liquor extracted from the lower screen(s) 32 is generally hotter than the temperature of the black liquor extracted from the top separator to lines 21 and 24. For example, the temperature of the black liquor extracted from the lower screen(s) 32 is typically about 140° C. and the temperature of the black liquor extracted from the top separator tends to be about 110° C.

Below the lower elevation screens and near the pulp discharge, cold blow, e.g., cooled wash liquor, is added to reduce the temperature of the pulp being discharged from the digester through line 145. The cold blow is provided from a source 142 of cooling liquor and passes through a cold blow cooler 143 and lines to direct the cold blow to the bottom of the digester.

The hot black liquor may be added to liquor line 24 to allow the hot black liquor to mix with the liquor from the top separator before the mixed liquor streams are added to the chip transport conduit 18. The temperature of the mixed liquor in line 24 is substantially hotter, e.g., at least 20° C. hotter, than the chip slurry in the impregnation vessel 12.

The hot liquor from line 24 and pump 17 heats the chips in line 18. The increased temperature of the chips in line 18 reduces the energy required to heat the chips in the digester vessel. The hot black liquor from the lower screen(s) 32 is used to raise the temperature of the chips to a cooking temperature or towards the cooking temperature. Due to the reduced need for heat energy, the quantity may be reduced of medium pressure steam 44 introduced via steam line 46 to the top of the digester vessel. Medium pressure steam is typically steam at 10 to 12 bar and a temperature of 180° C. to 190° C.

The hot black liquor from conduit 42, with optional pump 41, is added under pressure to the liquor in conduit 24 such that there is substantially no flashing, e.g., vaporization. The mixture of black liquor in conduit 24 is pumped 17 under pressure to the chip transport conduit 18 and, preferably, without flashing the liquor.

The liquor added to the chip transport conduit 18 increases the liquor to wood ratio (L.W.) in the conduit 18. The L.W. ratio in the impregnation vessel 12 and digester 14 is typically lower than the L.W. ratio in conduit 18 because of the liquor added to the conduit and extracted in the top separator.

By using the liquor, e.g., wash liquor, line 40 to heat the chip slurry in line 24, the amount of medium pressure steam added to the top of the digester may be substantially reduced, such as a reduction of about 40%. Reducing the amount of medium pressure steam needed to heat the chips in the top of the digester vessel results in a corresponding reduction in the energy requirements of the pulping process. Further, reducing the amount of medium pressure steam injected into the digester vessel also reduces the water condensate to the digester and thereby reduces the need for evaporator operations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for heating a chip slurry in a pulping system including an impregnation vessel and a chemical digesting vessel, the method comprising:

impregnating chips in the impregnation vessel with a liquor;

transporting the chips from the impregnation vessel to an upper elevation of the digester vessel;

processing the chips through at least one cooking section in the digester vessel and at least one wash section below the at least one cooking section;

extracting hot liquor from a lower elevation of the digester vessel, wherein the extracted hot liquor has a temperature substantially higher than a temperature of the chips in the impregnation vessel and the lower elevation is below the at least one cooking section and adjacent at least one wash section of the digester vessel; and adding the extracted hot liquor from the lower elevation of the digester vessel to the chips to be or being transported from the impregnation vessel to the digester vessel, and heating the chips being transported with the heat energy in the extracted liquor.

2. A method as in claim 1 wherein the temperature of the chips while being transported is no greater than 120° C. and the temperature of the extracted hot liquor from the lower elevation of the digester vessel is at least 130° C.

3. A method as in claim 1 wherein the digester vessel is a continuous digester vessel and a continuing stream of chips are transported to the digester vessel.

4. A method as in claim 1 wherein the chips are transported to a top separator in the upper elevation of the digester vessel.

5. A method as in claim 1 wherein a liquor concentration of the chips being transported is greater than a liquor concentration of the chips in the impregnation vessel and in the digester vessel.

6. A method as in claim 1 wherein a temperature of the extracted hot liquor is at least 20° C. greater than a temperature of the chips in the impregnation vessel.

7. A method as in claim 1 further comprising extracting liquor from the transported liquor in a top separator of the digester vessel, wherein liquor from the top separator is mixed with the extracted hot liquor from the lower elevation prior to adding the extracted liquor to the chips.

8. A method as in claim 1 further comprising circulating liquor from an upper screen elevation to an upper region of the digester vessel.

9. A method as in claim 1 wherein about one-half of liquor extracted from a top separator in the digester vessel flows to a heat recovery system.

10. A method as in claim 1 wherein about one-half of liquor extracted from a top separator is mixed with the extracted hot liquor from the lower elevation prior to adding the extracted liquor to the chips.

11. A method for heating a chip slurry in a pulping system including an impregnation vessel and a chemical digesting vessel, the method comprising:

impregnating chips in the impregnation vessel with a liquor;

transporting the chips from the impregnation vessel to a top separator of the digester vessel;

processing the chips through at least one cooking section in the digester vessel and at least one wash section below the at least one cooking section;

extracting hot liquor from a lower elevation screen of the digester vessel, wherein the extracted hot liquor has a temperature at least 20 degrees Celsius higher than a temperature of the chips in the impregnation vessel, and the lower elevation is below the at least one cooking section and is below or adjacent the at least one wash section of the digester vessel;

adding extracted liquor from the lower elevation screen of the digester vessel to the chips being transported from the impregnation vessel to the digester vessel; and heating the chips being transported with heat energy from the extracted liquor.

12. A method as in claim 11 further comprising extracting liquor from the top separator and adding a portion of the extracted liquor from the top separator to the chips being transported from the impregnation vessel to the digester vessel.

13. A method as in claim 12 further comprising mixing the portion of extracted liquor from the top separator with the extracted hot liquor from the lower elevation of screen prior to adding the extracted liquor to the chips being transported.

14. A method as in claim 11 wherein the temperature of the chips while being transported is no greater than 120° C. and the temperature of the extracted hot liquor from the lower elevation of the digester vessel is at least 130° C.

15. A method as in claim 11 wherein a liquor concentration of a liquor and chip mixture being transported is greater than a liquor concentration of the mixtures in the impregnation vessel and in the digester vessel.

16. A method as in claim 11 further comprising circulating liquor from an upper screen elevation to an upper region of the digester vessel, wherein the upper region includes the at least one cooking section.

17. An apparatus for heating a chip slurry in a pulping system including an impregnation vessel and a chemical digesting vessel, the apparatus comprising:

a chip transport conduit extending from the impregnation vessel to the digesting vessel, wherein chips in the chip transport conduit flow from the impregnation vessel to the digesting vessel;

a washing section in the digesting vessel is below at least one cooking section in the digesting vessel;

a lower elevation screen associated with the washing section and on the digesting vessel below the at least one cooking section, wherein hot liquor is extracted from the lower elevation screen, and a first liquor conduit extending from the lower elevation screen to the chip transport conduit, wherein the hot liquor extracted from the lower elevation screen is added to the chip transport conduit.

18. An apparatus as in claim 17 further comprising a top separator in the digesting vessel and coupled to a discharge of the chip transport conduit, wherein a second liquor conduit receives liquor extracted from the top separator and is coupled to the chip transport conduit.

19. An apparatus as in claim 18 wherein the first liquor conduit includes a conduit directing a portion of the liquor extracted from the lower elevation screen to the chip transport conduit and a second portion of the liquor extracted from the lower elevation screen to a circulation conduit extending to an upper region of the digesting vessel.

20. An apparatus as in claim 17 wherein the liquor extracted from the lower elevation screen is added to a section of the chip transport conduit near the impregnation vessel.

* * * * *

US008444809C1

(12) EX PARTE REEXAMINATION CERTIFICATE (10661st)
United States Patent
Calandra

(10) Number: US 8,444,809 C1
(45) Certificate Issued: Jul. 15, 2015

(54) METHOD AND SYSTEM FOR DIRECT CONTACT OF HOT LIQUOR WITH WOOD CHIPS IN TRANSFER CIRCULATION

(75) Inventor: Anthony Calandra, Cumming, GA (US)

(73) Assignee: ANDRITZ INC., Glens Falls, NY (US)

Reexamination Request:
No. 90/013,339, Sep. 6, 2014

Reexamination Certificate for:
Patent No.: 8,444,809
Issued: May 21, 2013
Appl. No.: 11/767,761
Filed: Jun. 25, 2007

(51) Int. Cl.
D21C 3/22 (2006.01)
D21C 7/06 (2006.01)
D21C 3/24 (2006.01)
D21C 7/10 (2006.01)
H04W 48/08 (2009.01)
H04W 84/12 (2009.01)
H04W 12/02 (2009.01)
H04W 48/16 (2009.01)
H04W 28/08 (2009.01)

(52) U.S. Cl.
CPC .. D21C 3/22 (2013.01); D21C 3/24 (2013.01); D21C 7/06 (2013.01); D21C 7/10 (2013.01); H04W 12/02 (2013.01); H04W 28/08 (2013.01); H04W 48/08 (2013.01); H04W 48/16 (2013.01); H04W 84/12 (2013.01); Y02B 60/50 (2013.01)

(58) Field of Classification Search
None
See application file for complete search history.

(56) References Cited

To view the complete listing of prior art documents cited during the proceeding for Reexamination Control Number 90/013,339, please refer to the USPTO's public Patent Application Information Retrieval (PAIR) system under the Display References tab.

Primary Examiner — Terrence Till

(57) ABSTRACT

A method for heating a chip slurry in a pulping system including an impregnation vessel and a chemical digesting vessel, the method including: impregnating chips in the impregnation vessel with a liquor; transporting the chips from the impregnation vessel to an upper elevation of the digester vessel; extracting liquor from a lower elevation of the digester vessel, wherein the extracted liquor has a temperature substantially higher than a temperature of the chips being transported to the upper elevation of the digester vessel, and adding extracted liquor from the lower elevation of the digester vessel to the chips being transported from the impregnation vessel to the digester vessel.

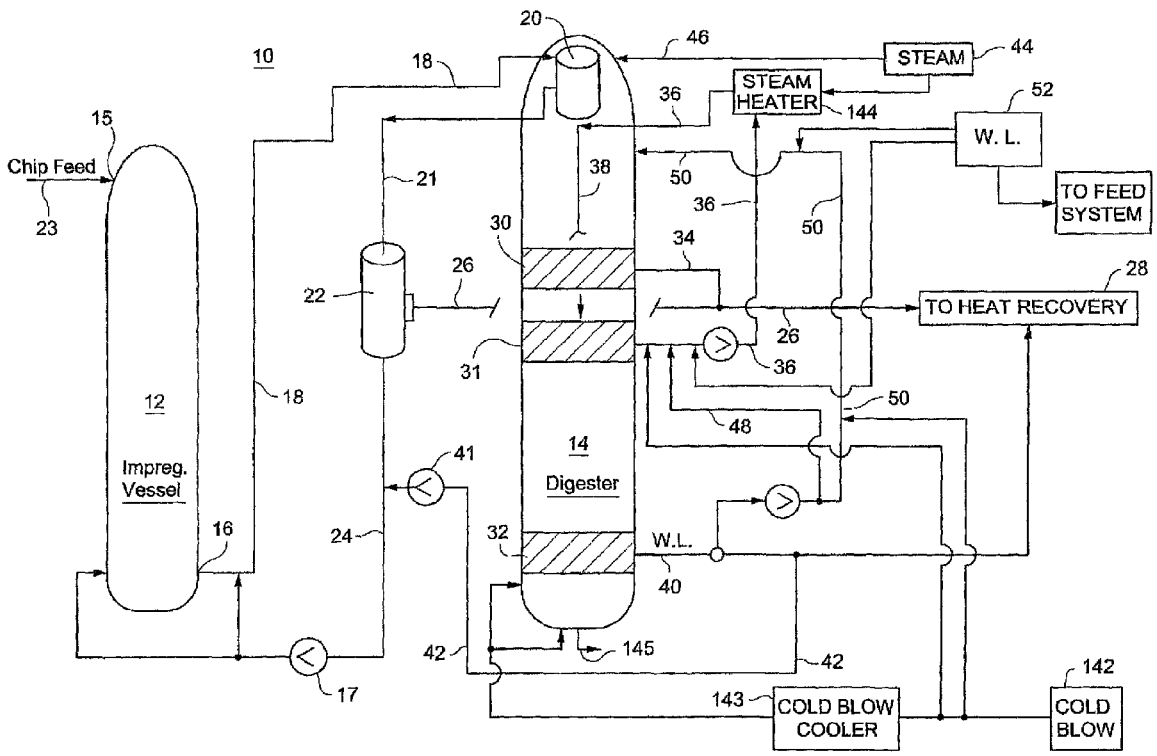

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 6, 7, 10, 11, 13, 14, 17, 19 and 20 are determined to be patentable as amended.

Claims 3-5, 8, 9, 12, 15, 16 and 18, dependent on an amended claim, are determined to be patentable.

1. A method for heating a chip slurry in a pulping system including an impregnation vessel and a chemical digesting vessel, the method comprising:
   impregnating chips in the impregnation vessel with a liquor;
   transporting the chips from the impregnation vessel to an upper elevation of the digester vessel;
   processing the chips through at least one cooking section in the digester vessel and at least one wash section below the at least one cooking section *and at a lower elevation of the digester vessel;*
   *adding a wash liquor to the wash section;*
   extracting *a hot liquor mixture that includes* hot liquor *and wash liquor* from [a] *the wash section in the* lower elevation of the digester vessel, wherein the extracted hot liquor *mixture* has a temperature substantially higher than a temperature of the chips in the impregnation vessel, and the lower elevation is below the at least one cooking section and adjacent at least one wash section of the digester vessel; and
   adding *a portion of* the extracted hot liquor *mixture* from *the wash section in* the lower elevation of the digester vessel to the chips to be or being transported from the impregnation vessel to the digester vessel, and heating the chips being transported with the heat energy in the extracted liquor; *and*
   *adding a portion of the extracted hot liquor mixture from the lower elevation of the digester vessel to an upper region of the digester vessel in the cooking section.*

2. A method as in claim 1 wherein the temperature of the chips while being transported is no greater than 120° C. and the temperature of the extracted hot liquor *mixture* from *wash section in* the lower elevation of the digester vessel is at least 130° C.

6. A method as in claim 1 wherein a temperature of the extracted hot liquor *mixture* is at least 20° C. greater than a temperature of the chips in the impregnation vessel.

7. A method as in claim 1 further comprising extracting liquor from the transported liquor in a top separator of the digester vessel, wherein liquor from the top separator is mixed with the extracted hot liquor *mixture* from *the wash section in* the lower elevation prior to adding the extracted liquor to the chips.

10. A method as in claim 1 wherein about one-half of liquor extracted from a top separator is mixed with the extracted hot liquor *mixture* from the *wash section in the* lower elevation prior to adding the extracted liquor to the chips.

11. A method for heating a chip slurry in a pulping system including an impregnation vessel and a chemical digesting vessel, the method comprising:
    impregnating chips in the impregnation vessel with a liquor;
    transporting the chips from the impregnation vessel to a top separator of the digester vessel;
    processing the chips through at least one cooking section in the digester vessel and at least one wash section below the at least one cooking section;
    *adding a wash liquor to the wash section;*
    extracting *a hot liquor mixture that includes* hot liquor *and wash liquor* from a lower elevation *wash* screen of the digester vessel, wherein the extracted hot liquor *mixture* has a temperature at least 20 degrees Celsius higher than a temperature of the chips in the impregnation vessel, and the lower elevation *wash screen* is below the at least one cooking section and is below or adjacent the at least one wash section of the digester vessel;
    adding *a portion of the* extracted *hot* liquor *mixture* from the lower elevation *wash*-screen of the digester vessel to the chips being transported from the impregnation vessel to the digester vessel; [and]
    heating the chips being transported with heat energy from the extracted *hot* liquor *mixture; and*
    *adding a portion of the extracted hot liquor mixture from the lower elevation wash screen of the digester vessel to an upper region of the digester vessel in the cooking section.*

13. A method as in claim 12 further comprising mixing the portion of extracted liquor from the top separator with the extracted hot liquor *mixture* from the lower elevation [of] *wash* screen prior to adding the extracted liquor to the chips being transported.

14. A method as in claim 11 wherein the temperature of the chips while being transported is no greater than 120° C. and the temperature of the extracted hot liquor *mixture* from the lower elevation of the digester vessel is at least 130° C.

17. An apparatus for heating a chip slurry in a pulping system including an impregnation vessel and a chemical digesting vessel, the apparatus comprising:
    a chip transport conduit extending from the impregnation vessel to the digesting vessel, wherein chips in the chip transport conduit flow from the impregnation vessel to the digesting vessel;
    a washing section in the digesting vessel is below at least one cooking section in the digesting vessel;
    *a cold blow fluid system that adds wash liquor to the washing section;*
    a lower elevation screen associated with the washing section and on the digesting vessel below the at least one cooking section, wherein *a hot liquor mixture including* hot liquor *and wash liquor* is extracted from the lower elevation screen, and
    a first liquor conduit extending from the lower elevation screen to the chip transport conduit *and extending from the lower elevation screen to an upper region in the cooking section*, wherein the hot liquor *mixture* extracted from the lower elevation screen is added to the chip transport conduit *and to an upper region of the digester vessel in the cooking section*.

19. An apparatus as in claim 18 wherein the first liquor conduit includes a conduit directing a portion of the *hot* liquor *mixture* extracted from the lower elevation screen to the chip transport conduit and a second portion of the *hot* liquor *mixture* extracted from the lower elevation screen to a circulation conduit extending to an upper region of the digesting vessel.

20. An apparatus as in claim 17 wherein the *hot* liquor *mixture* extracted from the lower elevation screen is added to a section of the chip transport conduit near the impregnation vessel.

\* \* \* \* \*